US012656608B2

(12) United States Patent
Liu et al.

(10) Patent No.: US 12,656,608 B2
(45) Date of Patent: Jun. 16, 2026

(54) OBJECT DISTANCE ADJUSTING APPARATUS, VIRTUAL DISPLAY GLASSES AND VIRTUAL DISPLAY APPARATUS

(71) Applicants: Beijing BOE Display Technology Co., Ltd., Beijing (CN); BOE TECHNOLOGY GROUP CO., LTD., Beijing (CN)

(72) Inventors: Yuhong Liu, Beijing (CN); Haoran Jing, Beijing (CN); Ruijun Dong, Beijing (CN); Lili Chen, Beijing (CN); Feng Zi, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 931 days.

(21) Appl. No.: 17/915,546

(22) PCT Filed: Sep. 3, 2021

(86) PCT No.: PCT/CN2021/116448
§ 371 (c)(1),
(2) Date: Mar. 9, 2023

(87) PCT Pub. No.: WO2023/028990
PCT Pub. Date: Mar. 9, 2023

(65) Prior Publication Data
US 2024/0210692 A1     Jun. 27, 2024

(51) Int. Cl.
*G02B 27/01* (2006.01)

(52) U.S. Cl.
CPC ......... *G02B 27/0149* (2013.01); *G02B 27/01* (2013.01); *G02B 27/0176* (2013.01);
(Continued)

(58) Field of Classification Search
CPC ............ G02B 27/0176; G02B 27/0149; G02B 2027/0158; G02B 27/01; G02B 2027/0159
See application file for complete search history.

(56) References Cited

U.S. PATENT DOCUMENTS

| | | | | |
|---|---|---|---|---|
| 2017/0102549 | A1* | 4/2017 | Lee ..................... | G02B 27/0176 |
| 2020/0310119 | A1* | 10/2020 | Lee ..................... | G02B 27/0172 |

FOREIGN PATENT DOCUMENTS

| | | | |
|---|---|---|---|
| CN | 107015340 A | 8/2017 | |
| CN | 110109250 A * | 8/2019 ............... | G02B 7/04 |

(Continued)

*Primary Examiner* — Jia X Pan
(74) *Attorney, Agent, or Firm* — HOUTTEMAN LAW LLC

(57) ABSTRACT

An object distance adjusting apparatus includes: an object distance adjusting portion, for fixing an optical device and adjusting a position of the optical device relative to an object image display portion; a limiting portion, for fixing the object image display portion and limiting a limit position of the object distance adjusting portion relative to the object image display portion; and a connecting and fixing portion, which is on a side of the limiting portion away from the object distance adjusting portion and is connected to the object distance adjusting portion, for fixing the limiting portion, the optical device and the object image display portion. Virtual display glasses include an optical device, an object image display portion, and the object distance adjusting apparatus, which can fix the optical device and the object image display portion, and adjust the position of the optical device relative to the object image display portion.

16 Claims, 7 Drawing Sheets

(52) U.S. Cl.
    CPC ................ *G02B 2027/0159* (2013.01); *G02B*
                                      *2027/0192* (2013.01)

(56)                References Cited

FOREIGN PATENT DOCUMENTS

CN          212749397  U      3/2021
CN          213338224  U   *  6/2021

* cited by examiner

OBJECT DISTANCE ADJUSTING APPARATUS, VIRTUAL DISPLAY GLASSES AND VIRTUAL DISPLAY APPARATUS

TECHNICAL FIELD

The embodiment of the present disclosure belongs to the field of virtual display, and in particular, relates to an object distance adjusting apparatus, virtual display glasses and a virtual display apparatus.

BACKGROUND

VR (Virtual Reality) glasses and a virtual reality head-mounted display equipment, referred to as a VR head display, each are a product integrating simulation technology with various technologies such as computer graphics, human-machine interface technology, multimedia technology, sensing technology and network technology and are new human-machine interaction means created by the aid of computer and the latest sensor technology. The VR head display utilizes a head-mounted display equipment to close vision and hearing of a user to an outside world and guide the user to generate a feeling of being in a virtual environment. VR glasses are a leap-frog product, which urges every fan to not only experience it with surprise and joy, but also be deeply fascinated by the unknown of its birth and prospect.

SUMMARY

The embodiments of the present disclosure provide an object distance adjusting apparatus, virtual display glasses and a virtual display apparatus.

In a first aspect, an embodiment of the present disclosure provides an object distance adjusting apparatus, including:

an object distance adjusting portion, for fixing an optical device and adjusting a position of the optical device relative to an object image display portion;

a limiting portion, for fixing the object image display portion and limiting a limit position of the object distance adjusting portion relative to the object image display portion; and a connecting and fixing portion, which is on a side of the limiting portion away from the object distance adjusting portion and is connected to the object distance adjusting portion, for fixing the limiting portion, the optical device and the object image display portion.

In some embodiments, the object distance adjustment portion includes a first structure and a second structure;

the first structure is closer to the limiting portion than the second structure;

the first structure is used for fixing the optical device;

the second structure is fixedly connected to the connecting and fixing portion; and the first structure is movably connected to the second structure; and the first structure is movable away from or close to the connecting and fixing portion, relative to the second structure.

In some embodiments, the first structure includes a first barrel component; the second structure includes a second barrel component;

the first barrel component penetrates through the second barrel component, and axes of the first barrel component and the second barrel component coincide with each other;

an outer wall of the first barrel component is provided with an external thread; an inner periphery of the second barrel component is provided with an internal thread; the internal thread is adapted to the external thread such that the first barrel component is capable of being screwed in and out of the second barrel component.

In some embodiments, the first barrel component includes a first open end and a second open end, which are opposite to each other;

the external thread is provided on an outer wall of the first open end; and an inner wall of the first barrel component is provided with a clamping step for fixing the optical device.

In some embodiments, the optical device includes a first lens and a second lens;

the clamping step includes a first clamping step and a second clamping step, which are spaced apart by a set distance; the first clamping step is used for fixing the first lens; and the second clamping step is used for fixing the second lens.

In some embodiments, the second barrel component includes a first barrel sub-component and a second barrel sub-component, axes of the first barrel sub-component and the second barrel sub-component coincide with and abut on each other;

an inner periphery of the first barrel sub-component is configured to accommodate the limiting portion; an outer periphery of the first barrel sub-component is provided with a first fixing structure, which is configured to be fixedly connected to the connecting and fixing portion;

the internal thread is provided on an inner periphery of the second barrel sub-component; and an end part of the second barrel sub-component away from the first barrel sub-component is provided with a limiting structure, which is configured to prevent the first barrel component from separating from the second barrel component.

In some embodiments, the outer wall of the first open end is further provided with an indicator;

a surface of the limiting structure away from the second barrel component is provided with a plurality of negative diopters scale marks; and the indicator is configured to indicate a different one of the plurality of negative diopters scale marks as the first barrel component is screwed into or out of the second barrel component.

In some embodiments, the plurality of negative diopters scale marks are arranged at equal intervals, and a difference between two adjacent negative diopters scale marks of the plurality of negative diopters scale marks indicates minus 1.0 diopters; and as the indicator rotates for one circle relative to the second barrel component, an adjustment of negative diopters in a range of 0 to minus 6.0 diopters is obtained.

In some embodiments, an outer wall of the second open end is provided with an unsmooth knurling structure; and the indicator is between the external thread and the unsmooth knurling structure.

In some embodiments, the limiting portion includes a first ring member, and the object distance adjusting portion and the object image display portion are on two opposite sides of a ring surface of the first ring member, respectively; and an outer periphery of the first ring member is adapted to the inner periphery of the first barrel component, and the first ring member is embedded in the inner periphery of the first barrel sub-component; and an inner periphery of the first ring member is configured to fix the object image display portion.

In some embodiments, the first ring member faces the first open end, and axes of the first ring member and the first open end coincide with each other, and an orthographic projection of the first open end on the ring surface of the first ring member is at least partially on the ring surface of the first ring member.

In some embodiments, the connecting and fixing portion includes a first sub-portion, which is on a side of the first ring member away from the second barrel component;

an outer periphery of the first sub-portion includes a second fixing structure which is configured to be fixedly connected to the first fixing structure;

the object image display portion includes a circuit board and a display panel;

a surface of the first sub-portion close to the first ring member is configured to be in contact with the display panel to support the display panel;

a surface of the first sub-portion away from the first ring member is configured to mount the circuit board; and the circuit board is connected to the display panel through a via in the first sub-portion.

In some embodiments, the first structure further includes a third barrel component, which has a same structure as that of the first barrel component; and the third barrel component is connected to the first barrel component in a mirror symmetry with the first barrel component; and the second structure further includes a fourth barrel component, which has a same structure as that of the second barrel component; and the fourth barrel component is connected to the second barrel component in a mirror symmetry with the first barrel component.

In some embodiments, the limiting portion further includes a second ring member, which has a same structure as that of the first ring member; and the second ring member is connected to the first ring member in a mirror symmetry with the first ring member.

In some embodiments, the connecting and fixing portion further includes a second sub-portion, which has a same structure as that of the first sub-portion; and the second sub-portion is connected to the first sub-portion in a mirror symmetry with the first sub-portion.

In a second aspect, an embodiment of the present disclosure further provides a pair of virtual display glasses, including an optical device, an object image display portion, and the object distance adjusting apparatus descried above;

wherein the optical device is opposite to the object image display portion; and the object distance adjusting apparatus is configured to fix the optical device and the object image display portion, and adjust the position of the optical device relative to the object image display portion.

In some embodiments, the object image display portion includes a first display panel and a second display panel, which display a left eye picture and a right eye picture, respectively; and the optical device includes a first lens group and a second lens group, which correspond to the first display panel and the second display panel, respectively; the first lens group and the second lens group are configured to synthesize the left eye picture and the right eye picture into a superimposed picture of a plurality of pictures with different depths of field.

In a third aspect, an embodiment of the present disclosure further provides a virtual display apparatus, including the virtual display glasses described above.

BRIEF DESCRIPTION OF DRAWINGS

The accompanying drawings, which are included to provide a further understanding of embodiments of the present disclosure and constitute a part of this specification, serve to explain the present disclosure together with the embodiments of the present disclosure, but do not constitute a limitation of the present disclosure. The above and other features and advantages will become more apparent to one of ordinary skill in the art by describing detailed exemplary embodiments with reference to the accompanying drawings, in which.

Figure 1:
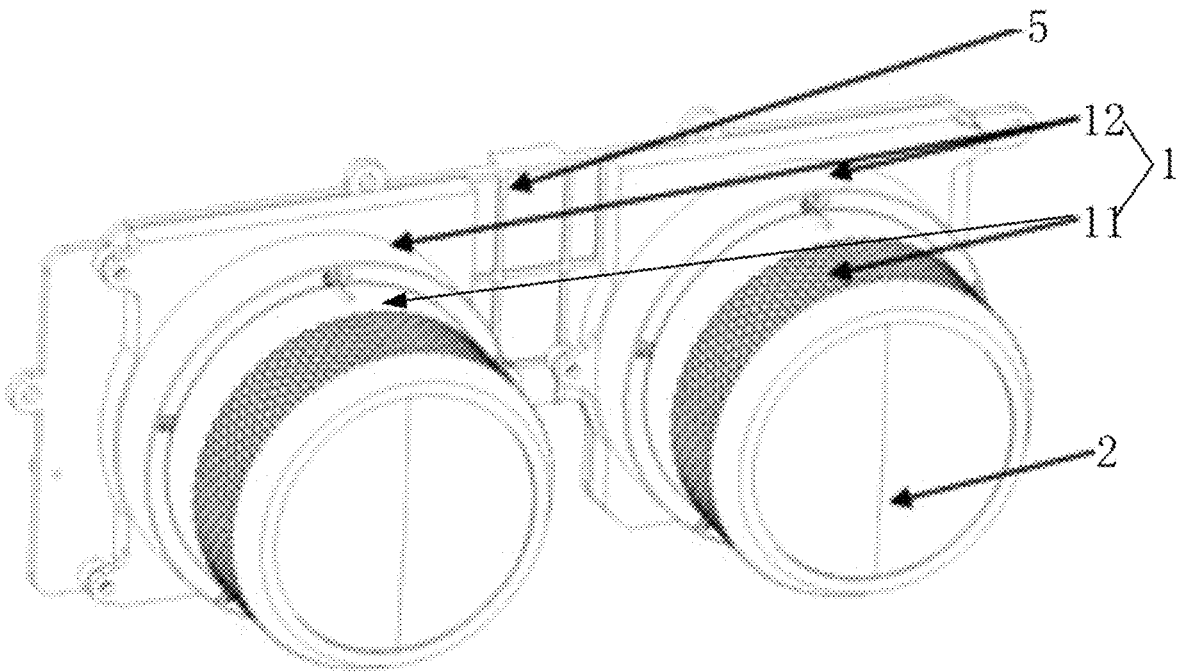
FIG. 1 is a schematic diagram illustrating a structure of an object distance adjusting apparatus after being assembled according to an embodiment of the present disclosure.

Reference numbers are as follows:

1. an object distance adjusting portion; 11. a first structure; 111. a first barrel component; 101. a first open end; 102. a second open end; 103. an external thread; 104. a clamping step; 1041. a first clamping step; 1042. a second clamping step; 105. an indicator; 106. an unsmooth knurling structure; 112. a third barrel component; 12. a second structure; 121. a second barrel component; 122. a first barrel sub-component; 123. a second barrel sub-component; 124. a first fixing structure; 125. an internal thread; 126. a limiting structure; 127. a negative diopters scale mark; 120. a fourth barrel component; 2. an optical device; 201. a first lens group; 202. a second lens group; 21. a first lens; 22. a second lens; 3. an object image display portion; 31. a first display panel; 32. a second display panel; 4. a limiting portion; 41. a first ring member; 42. a second ring member; 5. a connecting and fixing portion; 51. a first sub-portion; 52. a second fixing structure; 50. a second sub-portion.

DETAIL DESCRIPTION OF EMBODIMENTS

In order to enable one of ordinary skill in the art to better understand the technical solutions of the embodiments of the present disclosure, a virtual image display system, a data processing method thereof and a display apparatus provided in the embodiments of the present disclosure are described in further detail below with reference to the accompanying drawings and the detailed description.

The embodiments of the present disclosure will be described more fully hereinafter with reference to the accompanying drawings, and may be embodied in different forms and should not be construed as limited to the embodiments set forth herein. Rather, these embodiments are provided so that this disclosure will be thorough and complete, and will fully convey the scope of the present disclosure to one of ordinary skill in the art.

The embodiments of the present disclosure are not limited to the embodiments shown in the drawings, but include modifications of configurations formed based on a manufacturing process. Thus, regions illustrated in the drawings are schematic, and shapes of the regions shown in the drawings illustrate specific shapes of the regions, but are not intended to be limiting.

The VR glasses comprise a display screen and lenses. The display screen includes a left eye screen and a right eye screen, and the number of the lenses corresponding to the left eye screen and the right eye screen, respectively, is two. Centers of a pupil, the lenses and a display picture of the display screen (after screen splitting) are in a same straight line, thereby obtaining the best visual effect.

A display principle of the VR glasses is that the display content is split, the left eye screen and the right eye screen display a left eye image and a right eye image, respectively, and a superposition imaging is realized through the lenses. An "interpupillary distance" between the lenses is adjusted to be coincide with an interpupillary distance of eyes, and the eyes acquire information of the left eye image and right eye image with a difference to generate a stereoscopic impression in the mind.

However, a myopic eye watching the display content of the VR glasses needs to be matched with an equipment or a device for adjusting the diopters. There are three approaches for the structure of VR glasses to be compatible with myopia. A first approach: a user uses the VR glasses while wearing his own myopia glasses, which tends to reduce a comfort, and an achievable exit pupil distance is usually larger. A second approach: lenses with gradient negative diopters are used, and the user selects a lens with a proper negative diopters to quickly install and hang the lens on VR glasses according to the myopia condition, which tends to require a box for the lenses with negative diopters; when the lenses with negative diopters are lost or damaged, VR glasses cannot be used; meanwhile, the lenses are limited by quantity and the gradient, and cannot be perfectly matched with the negative diopters. A last approach: an optical lens barrel with adjustable object distance or focal length is used, so that the user can freely adjust corresponding parameters to match his own diopter, but the lens barrel with the diopter adjustable is complex in structure, has an increased number of parts and is bulky in structure, and causes difficulty in assembly and maintenance.

Figure 2:
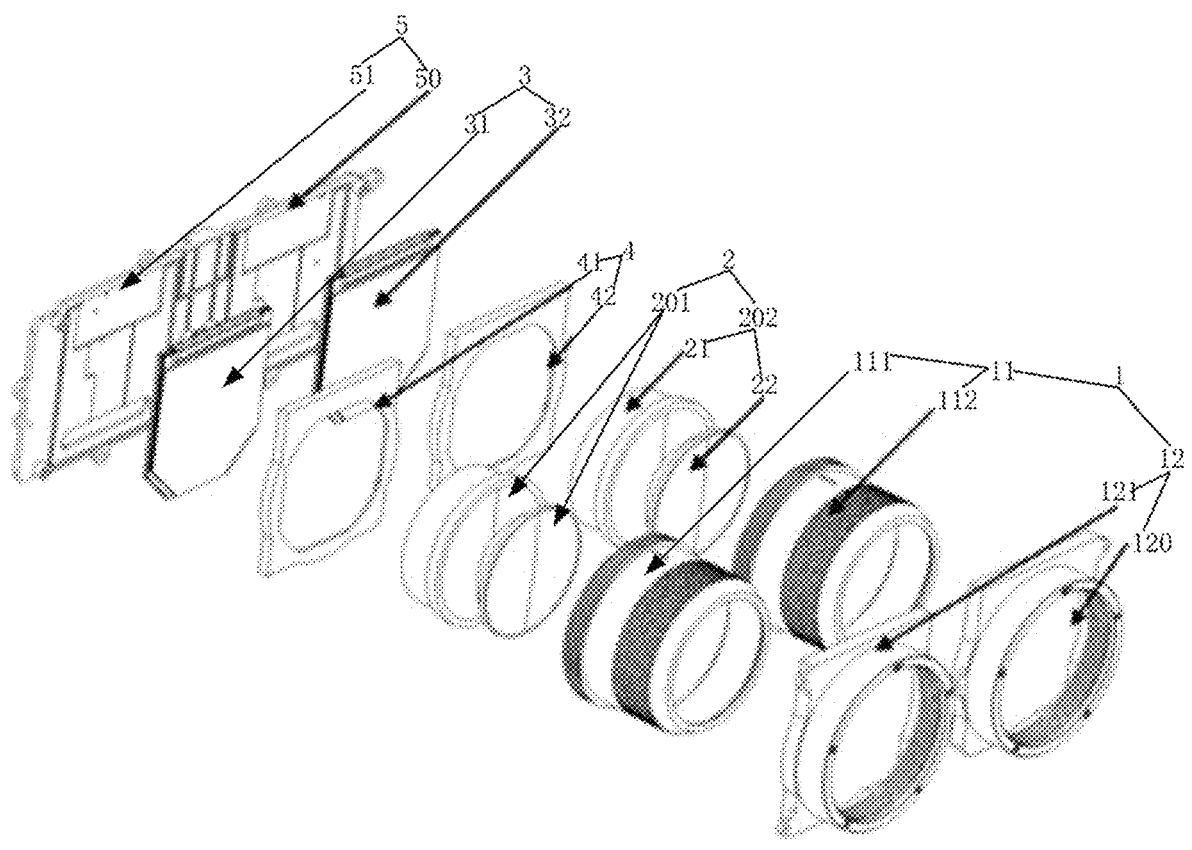
FIG. 2 is an exploded view of the object distance adjusting apparatus in FIG. 1.

In view of the above problems existing in the structure of VR glasses compatible with myopia, an embodiment of the present disclosure provides an object distance adjusting apparatus. Referring to FIGS. 1 and 2, the object distance adjusting apparatus includes: an object distance adjusting portion 1, for fixing an optical device 2 and adjusting a position of the optical device 2 relative to an object image display portion 3; a limiting portion 4, for fixing the object image display portion 3 and limiting a limit position of the object distance adjusting portion 1 relative to the object image display portion 3; and a connecting and fixing portion 5, which is on a side of the limiting portion 4 away from the object distance adjusting portion 1 and is connected to the object distance adjusting portion 1, for fixing the limiting portion 4, the optical device 2 and the object image display portion 3.

The object image display portion 3 is used for displaying a picture image, and the object image display portion 3 may include a first display panel 31 and a second display panel 32, and left eye and right eye correspond to the first display panel 31 and the second display panel 32, respectively. One picture is divided into two image fields, namely, a singular scanning line field or singular image field, formed by singular scanning lines, and an even scanning line field or even image field, formed by even scanning lines. The singular image field and the even image field are displayed by the first display panel 31 and the second display panel 32, respectively. That is, the singular image field and the even image field correspond to the left eye and the right eye, respectively. When a interlaced display mode is used for displaying a stereoscopic image, the left eye image and the right eye image can be placed into the singular image field and the even image field (or in reverse order), respectively, so that a stereoscopic display in interlaced mode is realized. The optical device 2 includes a first lens group 201 and a second lens group 202. The left eye and centers of the first lens group 201 and a display picture of the first display panel 31 are in a same straight line. The right eye and centers of the second lens group 202 and the display picture of the second display panel 32 are in a same straight line. Through the first lens group 201 and the second lens group 202, a superposition imaging of the single image field and the even image field can be realized. The interpupillary distance between the optical devices 2 is adjusted to coincide with the interpupillary distance of human eyes, and the human eyes generate stereoscopic impression in the mind after acquiring the information of the left eye image and the right eye image with a difference, so that the virtual display in a stereoscopic interlaced mode is realized.

In some embodiments, the object distance adjusting portion 1 includes a first structure 11 and a second structure 12. The first structure 11 is closer to the limiting portion 4 than the second structure 12. The first structure 11 is used to fix the optical device 2. The second structure 12 is fixedly connected to the connecting and fixing portion 5. The first structure 11 is movably connected to the second structure 12. The first structure 11 is movable relative to the second structure 12 away from or toward the connecting and fixing portion 5. With this arrangement, the object distance between optical device 2 and the object image display portion 3 can be adjusted, so that a requirement of human eyes on the negative diopters can be met when the human eye watches the display content of object image display portion 3.

In some embodiments, referring to FIGS. 3 to 6, first structure 11 includes a first barrel component 111. The second structure 12 includes a second barrel component 121. The first barrel component 111 penetrates through the second barrel component 121, and axes of the first barrel component 111 and the second barrel component 121 coincide. An outer wall of the first barrel component 111 is provided with an external thread 103. An inner periphery of the second cylindrical member 121 is provided with an internal thread 125. The internal thread 125 is adapted to the external thread 103, such that the first barrel component 111 can be screwed into and out of the second barrel component 121. In this embodiment, the internal thread 125 is adapted to the external thread 103, and the screwing in and screwing out of the first barrel component 111 relative to the second barrel component 121 are realized, thereby adjusting the object distance between the optical device 2 and the object image display portion 3.

Figure 3:
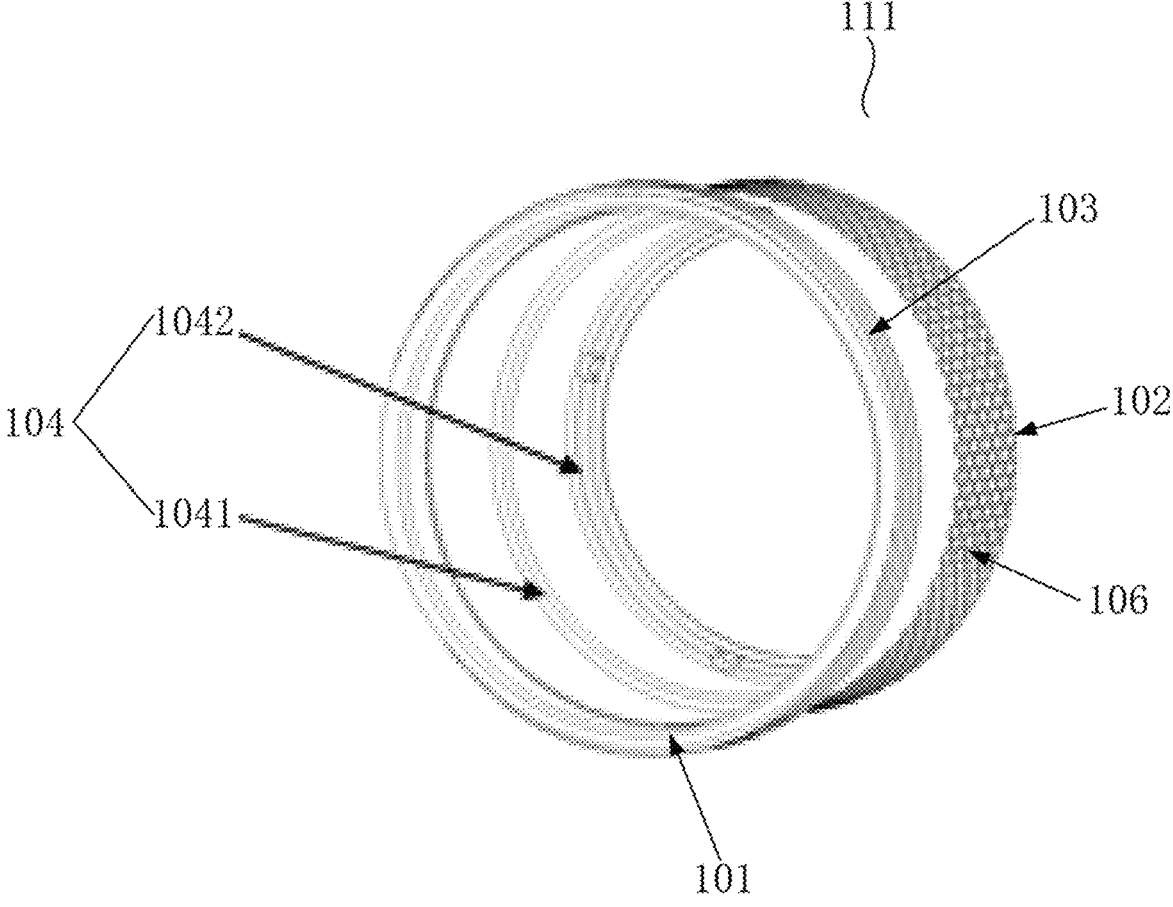
FIG. 3 is a schematic diagram illustrating a structure of an inner periphery of a first structure of an object distance adjusting portion in FIG. 1.
Figure 4:
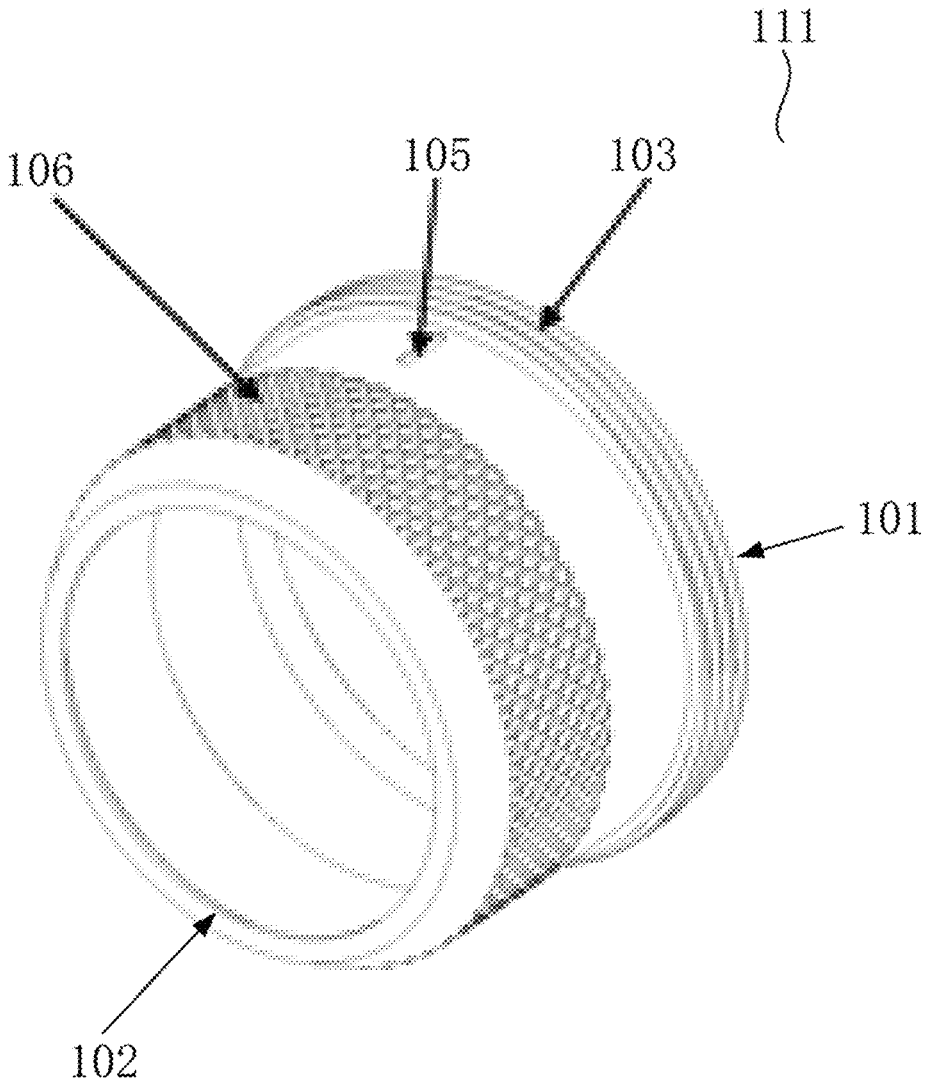
FIG. 4 is a schematic diagram illustrating a structure of an outer wall of the first structure of the object distance adjusting portion in FIG. 1.

In some embodiments, referring to FIGS. 3 and 4, the first barrel component 111 includes a first open end 101 and a second open end 102. The first open end 101 and the second open end 102 are opposite to each other. The external thread 103A is provided on an outer wall of the first open end 101. An inner wall of the first barrel component 111 is provided with a clamping step 104, which is used to fix the optical device 2.

In some embodiments, the first barrel component 111 is hollow, with axes of the first open end 101 and the second open end 102 coinciding with each other. In some embodiments, the external thread 103 has a height so that the structure can operate smoothly.

In some embodiments, the optical device 2 includes a first lens 21 and a second lens 22. The clamping step 104 includes a first clamping step 1041 and a second clamping step 1042. The first clamping step 1041 and the second clamping step 1042 is provided with a set distance therebetween. The first clamping step 1041 is used to fix the first lens 21. The second clamping step 1042 is used to fix the second lens 22. The first lens group 201 corresponding to the left eye includes a first lens 21 and a second lens 22. The second lens group 202 corresponding to the right eye includes a first lens 21 and a second lens 22.

Figure 5:
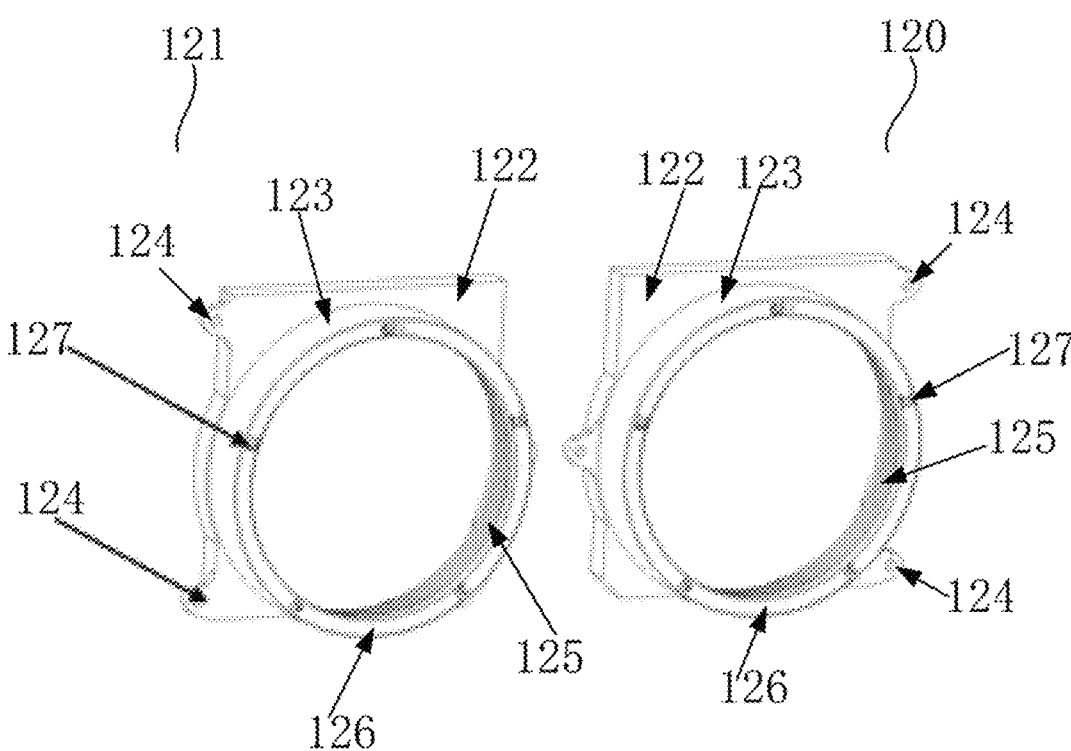
FIG. 5 is a schematic diagram illustrating a structure of an outer wall of a second structure of the object distance adjusting portion in FIG. 1.
Figure 6:
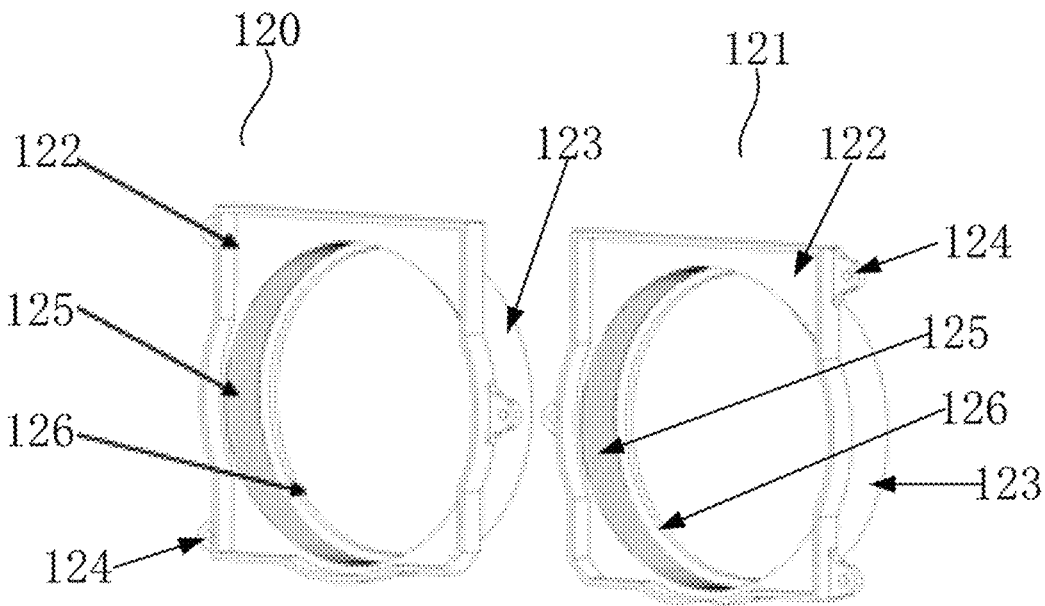
FIG. 6 is a schematic diagram illustrating a structure of an inner periphery of the second structure of the object distance adjusting portion in FIG. 1.

In some embodiments, referring to FIGS. 5 and 6, the second barrel component 121 includes a first barrel sub-component 122 and a second barrel sub-component 123, and axes of the first barrel sub-component 122 and the second barrel sub-component 123 coincide with and abut on each other. An inner periphery of the first barrel sub-component 122 can accommodate the limiting portion 4. An outer periphery of the first barrel sub-component 122 is provided with a first fixing structure 124, which can be fixedly connected to the connecting and fixing portion 5. The internal thread 125 is provided on an inner periphery of the second barrel sub-component 123. The internal thread 125 is adapted to the external thread 103. An end of the second barrel sub-component 123 away from the first barrel sub-component 122 is provided with a limiting structure 126, which can restrict the first barrel component 111 from separating from the second barrel component 121.

In some embodiments, the second barrel component 121 is hollow. An outer edge of the first barrel sub-component 122 has a rectangular shape, and an outer edge of the second barrel sub-component 123 has a circular shape. In some embodiments, the inner periphery of the first barrel sub-component 122 is a rectangular sink that can accommodate the limiting portion 4. In some embodiments, the first fixing structure 124 is a lug protruding from the outer periphery of the first barrel sub-component 122, and the lug has a threaded hole, which can be screwed and fixed with a threaded hole formed at a corresponding position of the connecting and fixing portion 5. In some embodiments, the limiting structure 126 is a clamping step structure extending from the second barrel sub-component 123 in a direction perpendicular to the axis of the second barrel sub-component 123 toward the position of the axis of the second barrel sub-component 123. The clamping step structure may surround an opening at the end of the second barrel sub-component 123 for one circle, or may be disposed at one or more positions of the opening at the end of the second barrel sub-component 123, as long as the clamping step structure can restrict the first barrel component 111 from being completely screwed out of (i.e., separated from) the opening at the end of the second barrel sub-component 123 away from the first barrel sub-component 122.

In some embodiments, the outer wall of the first open end 101 is further provided with an indicator 105. A surface of the limiting structure 126 away from the second barrel sub-component 123 is provided with a plurality of negative diopters scale marks 127. The indicator 105 may indicate different negative diopters scale marks 127 as the first barrel component 111 is screwed into and out of the second barrel component 121. Therefore, the object distance between the optical device 2 and the object image display portion 3 can be accurately adjusted according to the negative diopters of a user, and the object distance can be rapidly adjusted according to the myopia condition of the user, so that the requirement of clearly watching a stereoscopic display picture can be met. The negative diopters scale mark 127 corresponds to the myopia diopter.

In some embodiments, the plurality of negative diopters scale marks 127 are arranged at equal intervals, and a difference between two adjacent negative diopters scale marks 127 is minus 1.0 diopters. An adjustment of negative diopters in a range of 0 to minus 6.0 diopters can be realized as the indicator 105 rotates for one circle relative to the second barrel component 121. In some embodiments, an adjustment of negative diopters in a range of 0 to minus 10.0 diopters can be realized as the indicator 105 rotates for one circle relative to the second barrel component 121.

In some embodiments, an outer wall of the second open end 102 is provided with an unsmooth knurling structure 106. The indicator 105 is located between the external thread 103 and the unsmooth knurling structure 106. After this object distance adjusting apparatus is assembled, the unsmooth knurling structure 106 can be exposed outside the second barrel component 121, to facilitate a hand touching the unsmooth knurling structure 106 and rotating the first barrel component 111. The unsmooth knurling structure 106 can strengthen a roughness of a contact surface with the hand, and facilitate the hand twisting the first barrel component 111 smoothly, realizing the screwing in and screwing out of the first barrel component 111 in the second barrel component 121.

Figure 7:
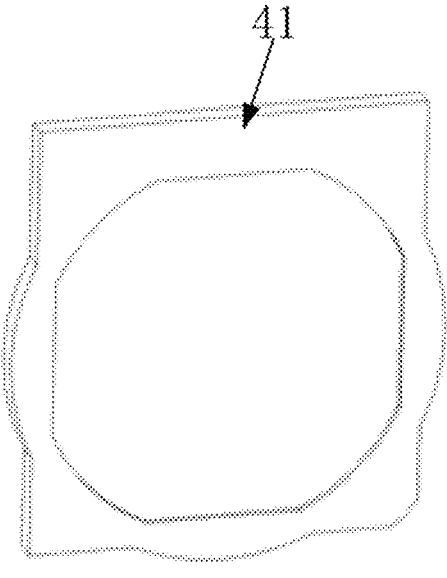
FIG. 7 is a schematic diagram illustrating a structure of a side of a limiting portion facing the object distance adjusting portion in FIG. 1.
Figure 8:
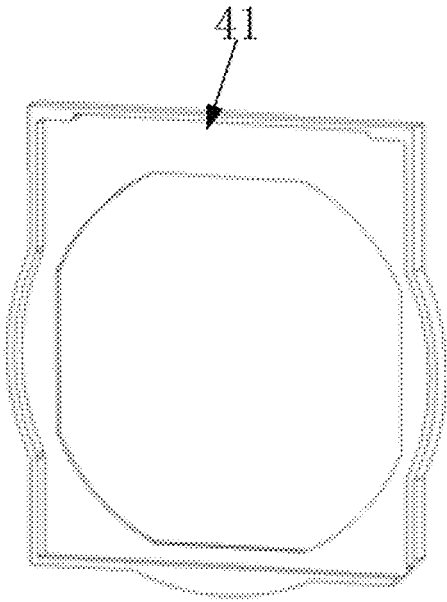
FIG. 8 is a schematic diagram illustrating a structure of a side of the limiting portion opposite to the object distance adjusting portion in FIG. 1.

In some embodiments, referring to FIGS. 7 and 8, the limiting portion 4 includes a first ring member 41, and the object distance adjusting portion 1 and the object image display portion 3 are located on two opposite sides of a ring surface of the first ring member 41, respectively. An outer periphery of the first ring member 41 is adapted to the inner periphery of the first barrel sub-component 122, and the first ring member 41 is embedded in the inner periphery of the first barrel sub-component 122. Therefore, a relative position between the second barrel component 121 and the limiting portion 4 is fixed. The inner periphery of the first ring member 41 can be used to fix the object image display portion 3. The first ring member 41 is annular.

In some embodiments, the outer periphery of the first ring member 41 is snap-fit to the inner periphery of the first barrel member 122. In some embodiments, the outer periphery of the first ring member 41 and the inner periphery of the first barrel member 122 are adhesively attached to each other based on the snap-fit attachment.

In some embodiments, the inner periphery of the first ring member 41 may be used to fix a part of an outer peripheral edge of the object image display portion 3. In some embodiments, the inner periphery of the first ring member 41 may be used to fix the entire outer peripheral edge of the object image display portion 3.

In some embodiments, the inner periphery of the first ring member 41 is snap-fit to a part of the outer peripheral edge or the entire outer peripheral edge of the object image display portion 3. In some embodiments, the inner periphery of the first ring member 41 and the part of the outer peripheral edge or the entire outer peripheral edge of the object image display portion 3 are adhesively attached to each other based on the snap-fit attachment.

In some embodiments, the first ring member 41 faces the first open end 101, and axes of the first ring member 41 and the first open end 101 coincide, and an orthographic projection of the first open end 101 on a ring surface of the first ring member 41 is at least partially on the ring surface of the first ring member. With such an arrangement, when the first barrel component 111 is intended to be screwed out the second barrel component 121 in a direction approaching the first ring member 41, the first barrel component 111 is clamped by the first ring member 41 when being screwed out to touch the ring surface of the first ring member 41, and cannot be screwed out further in the direction approaching the first ring member 41, so that the object image display portion 3 is protected from being damaged.

Figure 9:
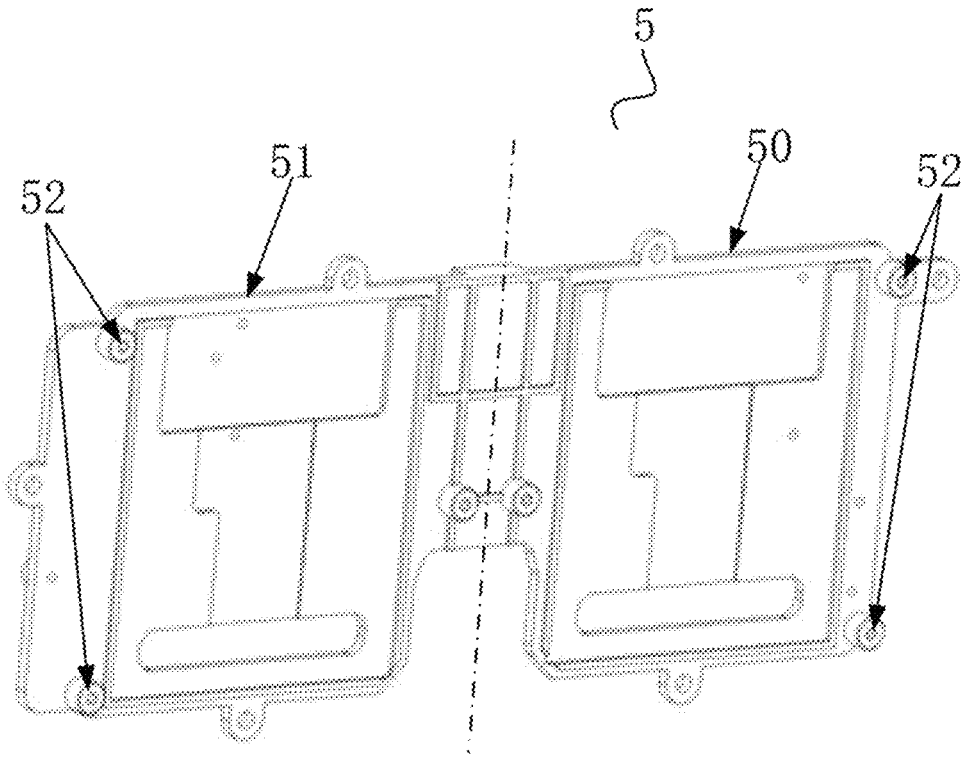
FIG. 9 is a schematic diagram illustrating a structure of a connecting and fixing portion in FIG. 1.

In some embodiments, referring to FIG. 9, the connecting and fixing portion 5 includes a first sub-portion 51, which is located on a side of the first ring member 41 away from the second barrel component 121. An outer periphery of the first sub-portion 51 includes a second fixing structure 52, which can be fixedly connected to the first fixing structure 124. The object image display portion 3 includes a circuit board and a display panel. A surface of the first sub-portion 51 close to the first ring member 41 may be used to be in contact with the display panel to support the display panel. A surface of the first sub-portion 51 away from the first ring member 41 can be used for mounting the circuit board. The circuit board is connected to the display panel through a via opened in the first sub-portion 51. The circuit board is used for driving the display panel to display.

In some embodiments, the first fixing structure 124 may be a threaded hole formed in the lug. The second fixing structure 52 may be a lug protruding from the outer periphery of the first sub-portion 51, and the lug has a threaded hole, and the threaded hole can be fixedly connected to the threaded hole of the first fixing structure 124 by a screw.

In some embodiments, referring to FIGS. 1 and 2, the first structure 11 further includes a third barrel component 112, which has a same structure as that of the first barrel component 111. The third barrel component 112 is connected to the first barrel component 111 in a mirror symmetry with the first barrel component 111. The second structure 12 further includes a fourth barrel component 120. The fourth barrel component 120 has a same structure as that of the second barrel component 121. The fourth barrel component 120 is connected to the second barrel component 121 in a mirror symmetry with the second barrel component 121. The first barrel component 111 and the third barrel component 112 correspond to the left eye and the right eye, respectively. The second barrel component 121 and the fourth barrel component 120 correspond to the left eye and the right eye, respectively.

In some embodiments, referring to FIGS. 2, 7 and 8, the limiting portion 4 further includes a second ring member 42, which has a same structure as that of the first ring member 41. And the second ring member 42 is connected to the first ring member 41 in a mirror symmetry with the first ring member 41. The first ring member 41 and the second ring member 42 correspond to the left eye and the right eye, respectively.

In some embodiments, referring to FIGS. 2 and 9, the connecting and fixing portion 5 further includes a second sub-portion 50, which has a same structure as that of the first sub-portion 51. The second sub-portion 50 is connected to the first sub-portion 51 in a mirror symmetry with the first sub-portion 51. The first sub-portion 51 and the second sub-portion 50 correspond to the left eye and the right eye, respectively.

The embodiment of the present disclosure further provides an assembling method of the object distance adjusting apparatus with the above structure. With reference to FIG. 2, the assembling method includes: first, the first structure 11 and the second structure 12 of the object distance adjusting portion 1 are assembled together. The specific steps are as follows: the first barrel component 111 and the third barrel component 112 of the first structure 11 are inserted into the second barrel component 121 and the fourth barrel component 120 of the second structure 12, respectively, and the external threads 103 on the outer walls of the first barrel component 111 and the third barrel component 112 are matched with the internal threads 125 at the inner peripheries of the second barrel component 121 and the fourth barrel component 120, respectively.

Then, the limiting portion 4 and the second structure 12 after the above steps are assembled together. The specific steps are as follows: the outer peripheries of the first ring member 41 and the second ring member 42 of the limiting portion 4 are fitted into the inner peripheries of the first barrel sub-components 122 of the second barrel component 121 and the fourth barrel component 120 of the second structure 12, respectively.

Finally, the connecting and fixing portion 5 and the second structure 12 after the above steps are assembled together. The specific steps are as follows: the second fixing structures 52 at the outer peripheries of the first sub-portion 51 and the second sub-portion 50 of the connecting and fixing portion 5 are fixedly connected to the first fixing structures 124 at the outer peripheries of the first barrel sub-components 122 of the second barrel component 121 and the fourth barrel component 120 of the second structure 12, respectively. Thus, the assembling of the object distance adjusting apparatus is completed.

Through the object distance adjusting apparatus provided in the embodiments of the disclosure, the object distance between the optical device 2 and the object image display portion 3 can be adjusted, so that the requirement of the human eye on the negative diopter can be met when the human eye watches the display content of the object image display portion 3. The object distance adjusting apparatus has a less number of parts, has a simple and light structure, and is convenient in assembly and maintenance.

An embodiment of the present disclosure further provides a pair of virtual display glasses. Referring to FIGS. 1 and 2, the virtual display glasses include an optical device 2, an object image display portion 3, and the object distance adjusting apparatus in the above-described embodiment. The optical device 2 is disposed opposite to the object image display portion 3. The object distance adjusting apparatus can fix the optical device 2 and the object image display portion 3, and adjust the position of the optical device 2 relative to the object image display portion 3.

In some embodiments, the object image display portion 3 includes a first display panel 31 and a second display panel 32, which display a left eye picture and a right eye picture, respectively. The optical device 2 includes a first lens group 201 and a second lens group 202, which correspond to the first display panel 31 and the second display panel 32, respectively. The first lens group 201 and the second lens group 202 can synthesize the left eye picture and the right eye picture into a superimposed picture of a plurality of pictures with different depths of field. The "interpupillary distance" between the optical devices 2 is adjusted to coincide with the interpupillary distance between two human eyes, and the human eyes generate stereoscopic impression in the mind after acquiring the information of the left eye image and the right eye image with a difference, so that the virtual display of the virtual display glasses is realized.

In some embodiments, the left eye and centers of the first lens group 201 and a display picture of the first display panel 31 are in a same straight line. The right eye and centers of the second lens group 202 and a display picture of the second display panel 32 are in a same straight line. One picture is divided into two image fields, namely, a singular scanning line field or singular image field, formed by singular scanning lines, and an even scanning line field or even image field, formed by even scanning lines. The singular image field and the even image field are displayed by the first display panel 31 and the second display panel 32, respectively. That is, the singular image field and the even image field correspond to the left eye and the right eye, respectively. When an interlaced display mode is used for displaying a stereoscopic image, the left eye image and the right eye image can be placed into the singular image field and the even image field (or in a reverse order), respectively, so that a stereoscopic display in the interlaced display mode is realized.

In some embodiments, the first lens group 201 corresponding to the left eye includes a first lens 21 and a second lens 22. The second lens group 202 corresponding to the right eye includes a first lens 21 and a second lens 22. In some embodiments, the first lens 21 and the second lens 22 may be convex lenses.

In some embodiments, the first display panel 31 and the second display panel 32 may be liquid crystal display panels, and alternatively may be organic electroluminescent display panels (i.e., OLED display panels).

An embodiment of the present disclosure further provides an assembling method of the above described virtual display glasses. The assembling method includes: referring to FIG. 2, first, the first lens 21 and the second lens 22 in the first lens group 201 are fixed on the first clamping step 1041 and the second clamping step 1042 on the inner wall of the first barrel component 111 of the first structure 11, respectively. The first lens 21 and the second lens 22 in the second lens group 202 are fixed on the first clamping step 1041 and the second clamping step 1042 on the inner wall of the third barrel component 112 of the first structure 11, respectively. Then, the first structure 11 and the second structure 12 of the object distance adjusting portion 1 are assembled together. The specific steps are as follows: the first barrel component 111 and the third barrel component 112 of the first structure 11 are inserted into the second barrel component 121 and the fourth barrel component 120 of the second structure 12, respectively, and the external threads 103 on the outer walls of the first barrel component 111 and the third barrel component 112 are matched with the internal threads 125 at the inner peripheries of the second barrel component 121 and the fourth barrel component 120, respectively.

Then, the limiting portion 4 and the second structure 12 after the above steps are assembled together. The specific steps are as follows: the outer peripheries of the first ring member 41 and the second ring member 42 of the limiting portion 4 are fitted into the inner peripheries of the first barrel sub-components 122 of the second barrel component 121 and the fourth barrel component 120 of the second structure 12, respectively. Then, the first display panel 31 and the second display panel 32 of the object image display portion 3 are fixed to the inner peripheries of the first ring member 41 and the second ring member 42 of the limiting portion 4, respectively.

Finally, the connecting and fixing portion 5 and the second structure 12 after the above steps are assembled. The specific steps are as follows: the second fixing structures 52 at the outer peripheries of the first sub-portion 51 and the second sub-portion 50 of the connection fixing section 5 are fixedly connected to the first fixing structures 124 at the outer peripheries of the first barrel sub-components 122 of the second barrel component 121 and the fourth barrel component 120 of the second structure 12, respectively. Thus, the assembling of the object distance adjusting apparatus is completed.

In the virtual display glasses provided in the embodiment of the disclosure, the object distance between the optical device 2 and the object image display portion 3 can be adjusted through the object distance adjusting apparatus, so that the requirement of human eyes on the negative diopters can be met when the human eye watches the display content of object image display portion 3. The virtual display glasses have an object distance that can be adjusted simple and conveniently, have a less number of parts, have a simple and light structure, and are convenient in assembly and maintenance.

An embodiment of the present disclosure further provides a virtual display apparatus, which includes the above described virtual display glasses.

The virtual display apparatus may be any product or component with a display function, such as an LCD panel, an LCD television, an OLED panel, an OLED television, a mobile phone, a tablet computer, a monitor, a notebook computer, a digital photo frame, a navigator, or the like.

It will be understood that the above embodiments are merely exemplary embodiments adopted to illustrate the principles of the present disclosure, and the present disclosure is not limited thereto. It will be apparent to one of ordinary skill in the art that various changes and modifications can be made without departing from the spirit and scope of the present disclosure, and these changes and modifications are to be considered within the scope of the present disclosure.

What is claimed is:

1. An object distance adjusting apparatus, comprising:
   an object distance adjusting portion, for fixing an optical device and adjusting a position of the optical device relative to an object image display portion;
   a limiting portion, for fixing the object image display portion and limiting a limit position of the object distance adjusting portion relative to the object image display portion; and
   a connecting and fixing portion, which is on a side of the limiting portion away from the object distance adjusting portion and is connected to the object distance adjusting portion, for fixing the limiting portion, the optical device and the object image display portion,
   wherein the object distance adjustment portion comprises a first structure and a second structure;
   the first structure is closer to the limiting portion than the second structure;
   the first structure is used for fixing the optical device;
   the second structure is fixedly connected to the connecting and fixing portion; and the first structure is movably connected to the second structure; and the first structure is movable away from or close to the connecting and fixing portion, relative to the second structure, wherein the first structure comprises a first barrel component; the second structure comprises a second barrel component;

the first barrel component penetrates through the second barrel component, and axes of the first barrel component and the second barrel component coincide with each other;

an outer wall of the first barrel component is provided with an external thread; an inner periphery of the second barrel component is provided with an internal thread; the internal thread is adapted to the external thread such that the first barrel component is capable of being screwed in and out of the second barrel component, wherein the first barrel component comprises a first open end and a second open end, which are opposite to each other;

the external thread is provided on an outer wall of the first open end; and an inner wall of the first barrel component is provided with a clamping step for fixing the optical device, wherein the second barrel component comprises a first barrel sub-component and a second barrel sub-component, axes of the first barrel sub-component and the second barrel sub-component coincide with and abut on each other;

an inner periphery of the first barrel sub-component is configured to accommodate the limiting portion; an outer periphery of the first barrel sub-component is provided with a first fixing structure, which is configured to be fixedly connected to the connecting and fixing portion;

the internal thread is provided on an inner periphery of the second barrel sub-component; and an end part of the second barrel sub-component away from the first barrel sub-component is provided with a limiting structure, which is configured to prevent the first barrel component from separating from the second barrel component.

2. The object distance adjusting apparatus according to claim 1, wherein the optical device comprises a first lens and a second lens;

the clamping step comprises a first clamping step and a second clamping step, which are spaced apart by a set distance; the first clamping step is used for fixing the first lens; and the second clamping step is used for fixing the second lens.

3. The object distance adjusting apparatus according to claim 1, wherein the outer wall of the first open end is further provided with an indicator;

a surface of the limiting structure away from the second barrel component is provided with a plurality of negative diopters scale marks; and the indicator is configured to indicate a different one of the plurality of negative diopters scale marks as the first barrel component is screwed into or out of the second barrel component.

4. The object distance adjusting apparatus according to claim 3, wherein the plurality of negative diopters scale marks are arranged at equal intervals, and a difference between two adjacent negative diopters scale marks of the plurality of negative diopters scale marks indicates minus 1.0 diopters; and as the indicator rotates for one circle relative to the second barrel component, an adjustment of negative diopters in a range of 0 to minus 6.0 diopters is obtained.

5. The object distance adjusting apparatus according to claim 4, wherein an outer wall of the second open end is provided with an unsmooth knurling structure; and the indicator is between the external thread and the unsmooth knurling structure.

6. The object distance adjusting apparatus according to claim 1, wherein the limiting portion comprises a first ring member, and the object distance adjusting portion and the object image display portion are on two opposite sides of a ring surface of the first ring member, respectively; and an outer periphery of the first ring member is adapted to the inner periphery of the first barrel component, and the first ring member is embedded in the inner periphery of the first barrel sub-component; and an inner periphery of the first ring member is configured to fix the object image display portion.

7. The object distance adjusting apparatus according to claim 6, wherein the limiting portion further comprises a second ring member, which has a same structure as that of the first ring member; and the second ring member is connected to the first ring member in a mirror symmetry with the first ring member.

8. The object distance adjusting apparatus according to claim 6, wherein the first ring member faces the first open end, and axes of the first ring member and the first open end coincide with each other, and an orthographic projection of the first open end on the ring surface of the first ring member is at least partially on the ring surface of the first ring member.

9. The object distance adjusting apparatus according to claim 8, wherein the limiting portion further comprises a second ring member, which has a same structure as that of the first ring member; and the second ring member is connected to the first ring member in a mirror symmetry with the first ring member.

10. The object distance adjusting apparatus according to claim 8, wherein the connecting and fixing portion comprises a first sub-portion, which is on a side of the first ring member away from the second barrel component;

an outer periphery of the first sub-portion comprises a second fixing structure which is configured to be fixedly connected to the first fixing structure;

the object image display portion comprises a circuit board and a display panel;

a surface of the first sub-portion close to the first ring member is configured to be in contact with the display panel to support the display panel;

a surface of the first sub-portion away from the first ring member is configured to mount the circuit board; and the circuit board is connected to the display panel through a via in the first sub-portion.

11. The object distance adjusting apparatus according to claim 10, wherein the connecting and fixing portion further comprises a second sub-portion, which has a same structure as that of the first sub-portion; and the second sub-portion is connected to the first sub-portion in a mirror symmetry with the first sub-portion.

12. The object distance adjusting apparatus according to claim 1, wherein the first structure further comprises a third barrel component, which has a same structure as that of the first barrel component; and the third barrel component is connected to the first barrel component in a mirror symmetry with the first barrel component; and the second structure further comprises a fourth barrel component, which has a same structure as that of the second barrel component; and the fourth barrel component is connected to the second barrel component in a mirror symmetry with the first barrel component.

13. Virtual display glasses, comprising an optical device, an object image display portion, and the object distance adjusting apparatus according to claim 1;

wherein the optical device is opposite to the object image display portion; and the object distance adjusting apparatus is configured to fix the optical device and the object image display portion, and adjust the position of the optical device relative to the object image display portion.

14. The virtual display glasses according to claim 13, wherein the object image display portion comprises a first display panel and a second display panel, which display a left eye picture and a right eye picture, respectively; and the optical device comprises a first lens group and a second lens group, which correspond to the first display panel and the second display panel, respectively; the first lens group and the second lens group are configured to synthesize the left eye picture and the right eye picture into a superimposed picture of a plurality of pictures with different depths of field.

15. A virtual display apparatus, comprising the virtual display glasses according to claim 13.

16. A virtual display apparatus, comprising the virtual display glasses according to claim 3.

\* \* \* \* \*